United States Patent
Gehring et al.

(10) Patent No.: US 7,225,891 B2
(45) Date of Patent: Jun. 5, 2007

(54) CONTROL SYSTEM FOR A VEHICLE

(75) Inventors: Ottmar Gehring, Stuttgart (DE); Harro Heilmann, Ostfildern (DE); Andreas Schwarzhaupt, Oberrot (DE); Gernot Spiegelberg, Heimsheim (DE); Armin Sulzmann, Oftersheim (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/847,671

(22) Filed: May 18, 2004

(65) Prior Publication Data
US 2005/0000738 A1    Jan. 6, 2005

(30) Foreign Application Priority Data
May 19, 2003   (DE)   ................. 103 22 828

(51) Int. Cl.
*B60K 17/00*   (2006.01)
(52) U.S. Cl. .......................... 180/14.2; 701/41
(58) Field of Classification Search ............ 701/41–44, 701/70, 72; 180/14.1–14.4, 442, 445, 446.1, 180/448; 280/411.1, 412, 418.1, 419, 426
See application file for complete search history.

(56) References Cited

U.S. PATENT DOCUMENTS

| | | | | |
|---|---|---|---|---|
| 5,152,544 | A * | 10/1992 | Dierker et al. ............. | 280/432 |
| 5,247,442 | A * | 9/1993 | Kendall ..................... | 701/41 |
| 5,329,451 | A * | 7/1994 | Notsu ........................ | 701/41 |
| 5,579,228 | A * | 11/1996 | Kimbrough et al. ......... | 701/41 |
| 5,646,845 | A * | 7/1997 | Gudat et al. ................ | 701/41 |
| 5,747,683 | A * | 5/1998 | Gerum et al. .............. | 73/118.1 |
| 6,434,462 | B1 * | 8/2002 | Bevly et al. ................. | 701/50 |
| 6,494,476 | B2 * | 12/2002 | Masters et al. ............ | 280/426 |
| 6,498,977 | B2 * | 12/2002 | Wetzel et al. .............. | 701/70 |
| 6,622,076 | B1 * | 9/2003 | Eckert et al. ............... | 701/70 |

(Continued)

FOREIGN PATENT DOCUMENTS

DE    39 23 676 A1    1/1991

(Continued)

OTHER PUBLICATIONS

"Device to Assist In Backing Up a Trailer" Research Disclosure, Kenneth Mason Publications, Hampshire, GB, No. 323, Mar. 1, 1991, p. 211, XP000176308 ISSN: 0374-4353.

*Primary Examiner*—Lesley D. Morris
*Assistant Examiner*—L. Lum
(74) *Attorney, Agent, or Firm*—Crowell & Moring LLP (57) ABSTRACT

In a control system for a train composed of a towing vehicle and a trailer, the towing vehicle is equipped with an electronically actuatable drive train. A trailer steering angle actual value sensor determines a trailer actual steering angle of a wheel axle which steers the trailer. The driver of the vehicle can input a trailer setpoint steering angle via a trailer steering angle setpoint value sensor. A reversing device is provided which determines, from the trailer actual steering angle and the trailer setpoint steering angle, a modified towing vehicle setpoint steering angle of a wheel axle which steers the towing vehicle. In the active state of the reversing device, the modified towing vehicle setpoint steering angle takes the place of the present towing vehicle setpoint steering angle in a modified movement vector; and when the train is moving, it changes the trailer actual steering angle into the trailer setpoint steering angle when the modified movement vector is processed.

11 Claims, 5 Drawing Sheets

U.S. PATENT DOCUMENTS

| | | | | |
|---|---|---|---|---|
| 6,643,465 | B1 * | 11/2003 | Bosinger et al. | 398/59 |
| 6,668,225 | B2 * | 12/2003 | Oh et al. | 701/70 |
| 6,959,970 | B2 * | 11/2005 | Tseng | 303/146 |

FOREIGN PATENT DOCUMENTS

| | | |
|---|---|---|
| DE | 92 08 595 | 8/1992 |
| DE | 195 26 702 C2 | 2/1997 |
| DE | 198 06 655 A1 | 8/1999 |
| DE | 199 12 368 A1 | 9/2000 |
| DE | 100 32 179 A1 | 1/2002 |
| EP | 0 168 411 B1 | 1/1986 |
| JP | 53-78581 | 7/1978 |
| JP | 53-142731 | 12/1978 |
| JP | 1-95980 A | 4/1989 |
| JP | 10-1063 A | 1/1998 |
| JP | 11-124051 A | 5/1999 |

\* cited by examiner

CONTROL SYSTEM FOR A VEHICLE

BACKGROUND AND SUMMARY OF THE INVENTION

This application claims the priority of German patent document 103 22 828.4, filed 19 May 2003, the disclosure of which is expressly incorporated by reference herein.

The invention relates to a control system for a vehicle having a towing component with an electronically actuatable drive train, and a towed component.

German patent document DE 100 32 179 A1 discloses a control system of this type in which the vehicle is equipped with an electronically actuatable drive train having at least a steering system, a brake system and a drive assembly. Such control systems for vehicles with an electronically actuatable drive train are also referred to as drive-by-wire systems or as X by-wire systems. In such systems, the steering system, brake system and drive assembly of the vehicle can be controlled electronically without there being a continuous mechanical or hydraulic connection between corresponding operator control elements such as the steering wheel, brake pedal and accelerator pedal and the respective component of the drive train.

The control system comprises an operator control device which is fixed to the vehicle and into which a driver of the vehicle inputs a driver request by means of corresponding operator control elements such as a steering wheel, a brake pedal and an accelerator pedal. The operator control device generates a standardized movement vector from the driver request. The movement vector corresponds here, for example to a bus protocol, in particular a CAN protocol. The operator control device thus forms an input level for pre-defined values (driver requests) which are to be processed by the drive train.

The control system also comprises a control device which generates and outputs control signals for actuating the drive train from an input movement vector. The control signals are then transmitted to and processed by the drive train, in order to implement the driver request. The control device thus forms a coordination level which permits the standardized setpoint signals (driver request) to be implemented at the drive train.

In a "train" composed of a towing vehicle and trailer, maneuvering (particularly reversing) is comparatively difficult due to the complex kinematics between the towing vehicle and trailer, and even an experienced driver requires a comparatively large amount of time to carry it out. Such an articulated train has two steered wheel axles, one for the towing vehicle and one for the trailer, so that the kinematic coupling between the towing vehicle and trailer for reversing the train is complex.

Furthermore, an additional person is necessary to give instructions in order to reduce risks of collision between the train and obstacles. Since the person giving instructions is superfluous in terms of the actual function of the train, which is generally to transport a payload from a starting location to a destination, it is worthwhile to simplify the maneuvering of the train to such an extent that it can be carried out without a person giving instructions.

One object of the present invention is to provide a control system of the type described, which simplifies in particular the maneuvering and reversing of the train.

This and other objects and advantages are achieved by the control system according to the invention, in which the problem of reversing a train is reduced to a comparatively simple reversing problem for a single-element vehicle which has only one steered wheel axle. The reversing of a single-element vehicle with a steered front axle corresponds to the reversing of a normal passenger car and can therefore be carried out comparatively easily. In the present invention, the driver of the vehicle predefines a setpoint value for the trailer steering angle of a wheel axle which steers the trailer, using a corresponding setpoint value sensor. The setpoint value steers the trailer to the desired destination when the vehicle is reversed.

For this purpose, the invention provides a reversing device which, in an active state, determines a steering setpoint angle from the trailer setpoint steering angle (selected by the driver) and a current trailer actual steering angle for the steering system of the towing vehicle. The steering setpoint angle is calculated in such a way that, when it is implemented in a moving train, it changes the trailer steering angle to the desired setpoint value. In other words, the reversing device takes into account the complex kinematics between the towing vehicle and the trailer and generates, at the towing vehicle, a steering activation which brings about the steering activation at the trailer which is desired by the driver as the train moves. Maneuvering, and in particular reversing the train, can thus be considerably simplified.

Implementing the reversing device in the control system is comparatively simple here since only one modified movement vector has to be generated using the reversing device. This vector then brings about the desired steering movement of the trailer when the train moves.

In one advantageous embodiment, the driver of the vehicle inputs a driver request into a remote control device and which generates the movement vector from the driver request. A transceiver arrangement permits the necessary communication between the remote control device (which is remote from the vehicle), the reversing device and the control device. The communication expediently takes place by means of a drive train interface arrangement. The remote control device can have a trailer steering angle setpoint value sensor, so that it is particularly easy for the driver of the vehicle to predefine the necessary trailer setpoint steering angle by positioning himself at a suitable location in the vicinity of the trailer.

According to an advantageous embodiment of the invention, in the active state, the reversing device utilizes a towing vehicle steering angle setpoint value sensor (in particular that of the remote control device) as a trailer steering angle setpoint value sensor. In the passive state of the reversing device, the driver of the vehicle uses the towing vehicle steering angle setpoint value sensor of the cockpit and/or of the remote control device to input towing vehicle setpoint steering angles; while in the active state, the reversing device uses the towing vehicle setpoint steering angles which can be tapped at the towing vehicle steering angle setpoint value sensor present at the trailer setpoint steering angle. The invention thus makes use of a towing vehicle steering angle setpoint value sensor which is present in any case and gives it a double function. The reversing device is thus implemented without the need for additional steering angle setpoint value sensors for the trailer, and is therefore comparatively economical.

It goes without saying that the features which are mentioned above and the features which are to be explained below can be used not only in the respectively specified combination but also in other combinations or in isolation without departing from the scope of the present invention.

DETAILED DESCRIPTION OF THE DRAWINGS

Figure 1:
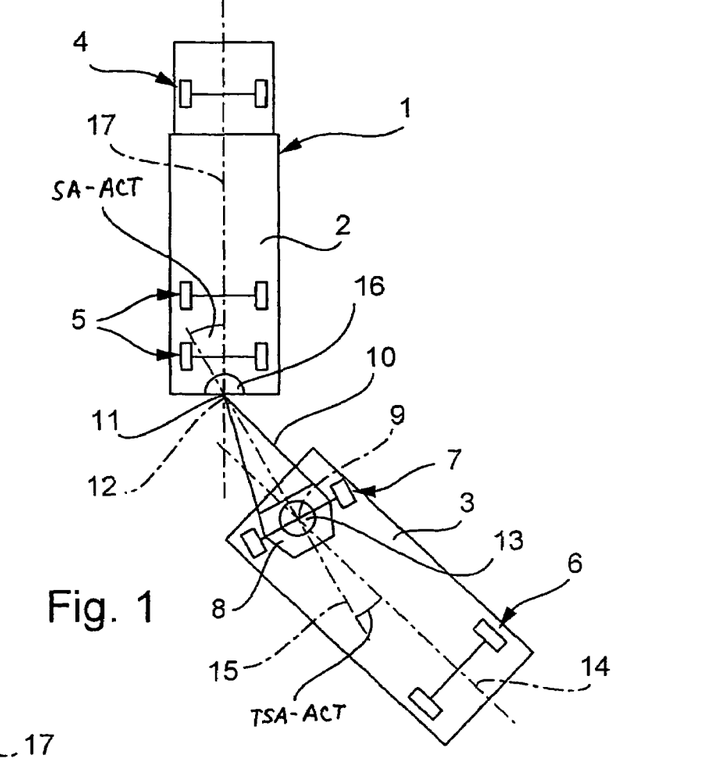
FIG. 1 shows a simplified schematic plan view of an articulated train.
Figure 2:
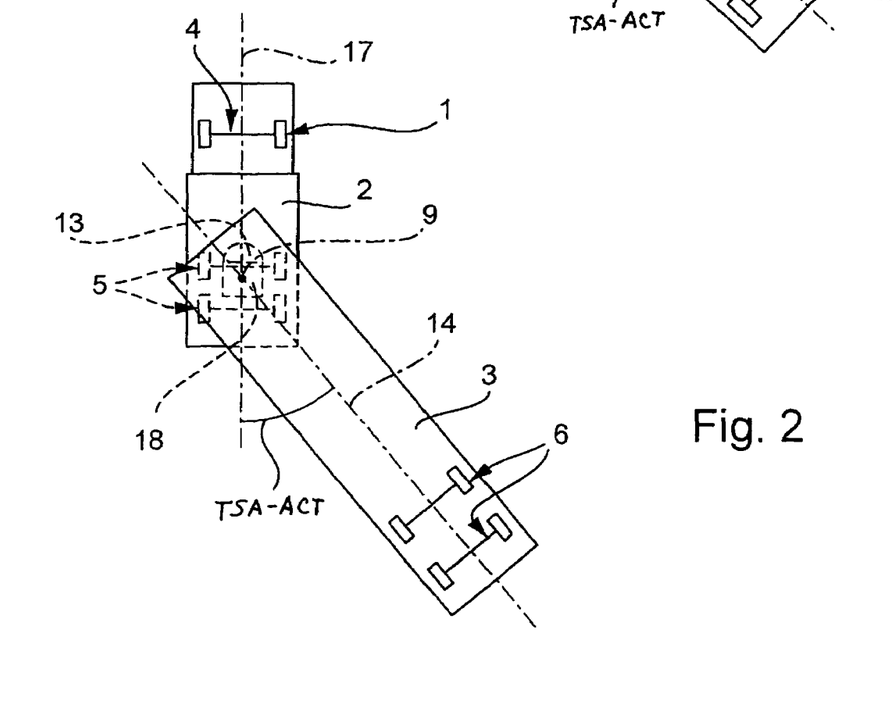
FIG. 2 shows a schematic plan view as in FIG. 1 but of a semitrailer train.

According to FIGS. 1 and 2, a vehicle 1, in the form of a train, has a towing vehicle 2 and a trailer 3. The towing vehicle 2 has at the front at least one steerable wheel axle 4 and at the rear at least one nonsteerable wheel axle 5. The trailer 3 comprises at least one nonsteerable wheel axle 6 which is arranged at the rear.

In the embodiment according to FIG. 1, the train 1 is articulated, and the trailer 3 also has a steerable wheel axle 7 at the front. This wheel axle 7 is mounted on the trailer 3 so as to be rotatable about a first vertical axis of rotation 9 by means of a live ring 8. The latter can be rotated by means of a shaft 10 which is attached to a trailer coupling 11 of the towing vehicle 2 and can be rotated about a second vertical axis 12 of rotation.

According to the invention, the train 1 is equipped with a trailer steering angle actual value sensor 13 which determines an actual trailer steering angle TSA-ACT. (The actual trailer steering angle TSA-ACT is the angle formed between the longitudinal axis 14 of the trailer 3 and the longitudinal axis 15 of the shaft 10, which intersect at the first axis of rotation 9.) Furthermore, the train 2 is equipped with a shaft angle actual value sensor 16 which determines an actual shaft angle SA-ACT (that is, the angle formed between the longitudinal axis 15 of the shaft 10 and the longitudinal axis 17 of the towing vehicle 2, which intersect at the second axis 12 of rotation).

In contrast to the embodiment according to FIG. 1, FIG. 2 shows a semitrailer train, in which a semitrailer rests on the towing vehicle 2 by means of a fifth wheel 18. A vertical axis of rotation (which corresponds to the first axis of rotation 9 of the articulated train 1 in FIG. 1) is then formed in the fifth wheel 18. Since the trailer 3 in the case of the semitrailer train 1 does not have a wheel axis at the front, the rear nonsteerable wheel axes 5 of the towing vehicle 2 are used to steer the trailer 3. Accordingly, the trailer steering angle actual value sensor 19 in this embodiment determines an actual trailer steering angle TSA-ACT formed between the longitudinal axis 14 of the trailer 3 and the longitudinal axis 17 of the towing vehicle 2. The kinematics of the semitrailer train 1 according to FIG. 2 are less complex, in particular for reversing, than those of the articulated train 1 according to FIG. 1.

Figure 3:
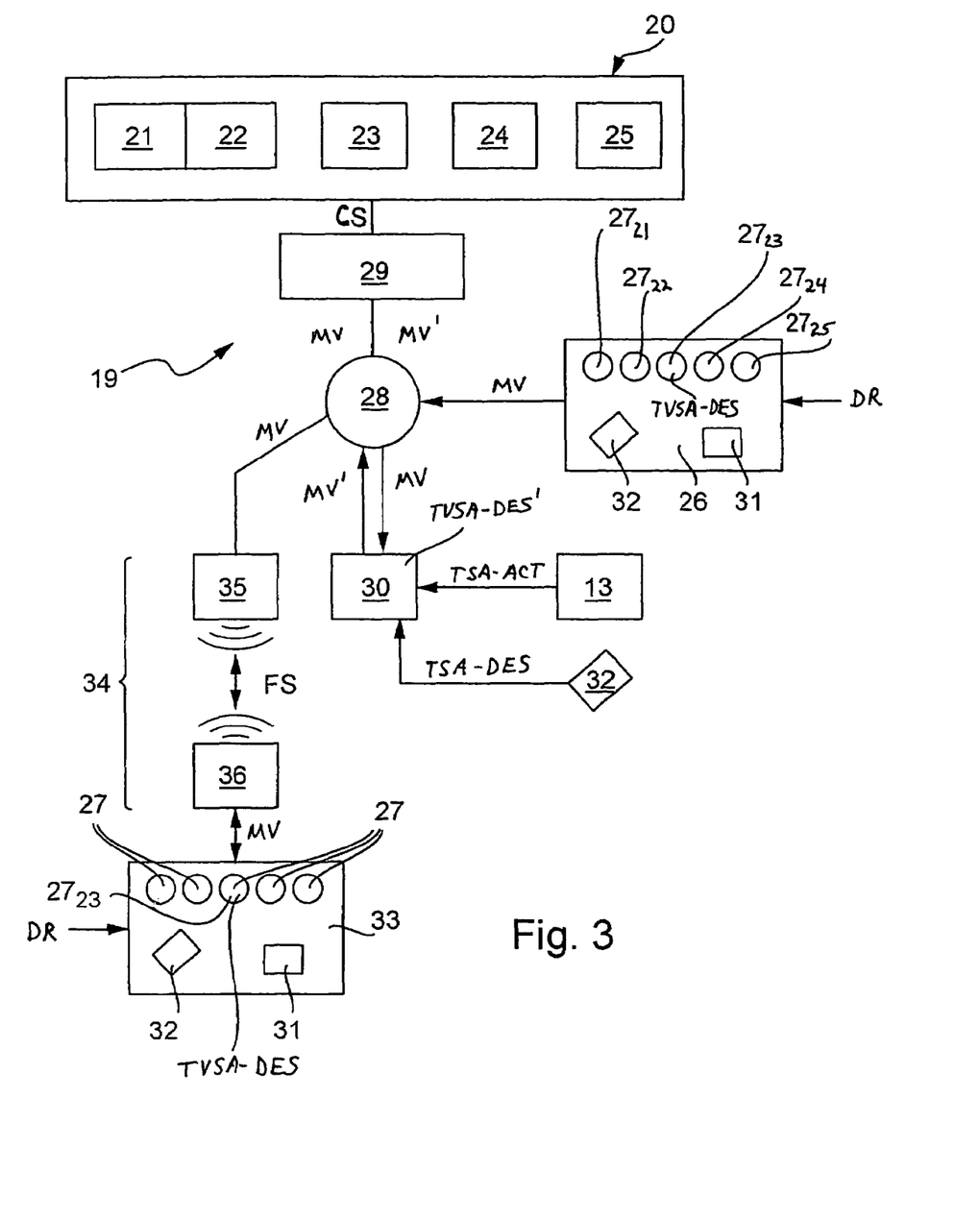
FIG. 3 is a schematic circuit diagram of a control system according to the invention.

As shown in FIG. 3, a control system 19 according to the invention comprises an electronically actuatable drive train 20 which is arranged in the vehicle 1 or in the towing vehicle 2, and includes at least a drive assembly 21, a gear mechanism 22, a steering system 23, a brake system 24 and a ride control device 25.

The control system 19 also comprises an operator control device 26 which is permanently installed in the vehicle 1 or in the towing vehicle 2. The operator control device 26 comprises a plurality of operator control elements 27 which are each assigned to one of the components 21 to 25 of the drive train 20. In particular, these are, for example, an accelerator pedal $27_{21}$, a gear shift $27_{22}$, a steering wheel $27_{23}$, a brake pedal $27_{24}$ and a control element $27_{25}$ for activating the ride control device 25. The steering wheel $27_{23}$ is used here as a towing vehicle steering angle setpoint value sensor which predefines a towing vehicle setpoint steering angle TVSA-DES which is to be set at the steerable wheel axle 4 of the towing vehicle.

A driver of a vehicle can thus use the operator control elements 27 to input a driver request DR—symbolized by an arrow—into the operator control device 26. The operator control device 26 is configured in such a way that it generates at its output a movement vector MV, based on the input driver request DR. The movement vector MV is standardized and includes the individual predefined values or setpoint values of the operator control element 27. The operator control device 26 is connected to a drive train interface arrangement 28 which has here at least one star point.

The control system 19 also has a control device 29, which is connected to the drive train 20 and to the drive train interface arrangement 28, and generates control signals C in response to a movement vector MV which is input thereto. The control signals CS are transmitted to the drive train 20 and can be processed by it or by its component 21 to 25 in order to implement the original driver request DR.

According to the invention, the control system 19 is also equipped with a reversing device 30 which simplifies maneuvering, particularly reversing, of the train 1. The reversing device 30 can be switched between an active state and a passive state via a switch 31 on the control device 26. The switched state of the switch 31 can be signaled, by means of the movement vector MV or as a separate signal, to the drive train interface arrangement 28 to which the reversing device 30 is connected. The reversing device 30 communicates with the trailer steering angle actual value sensor 13 from which it always receives the current actual trailer steering angle TSA-ACT. In addition, the reversing device 30 communicates with a trailer steering angle setpoint value sensor 32, (for example, a steering wheel or a joystick). The driver of the vehicle can use the trailer steering angle setpoint value sensor 32 to input a trailer setpoint steering angle TSA-DES, which is made available to the reversing device 30. According to the invention, the reversing device 30 determines a modified towing vehicle setpoint steering angle TVSA-DES' based on the trailer actual steering angle TSA-ACT and the trailer setpoint steering angle TSA-DES.

The effect of the reversing device 30 is that this modified towing vehicle setpoint steering angle TVSA-DES' takes the place of the present towing vehicle setpoint steering angle TVSA-DES in a modified movement vector MV'. The modified towing vehicle setpoint steering angle TVSA-DES' is calculated in such a way that, when the train 1 is moving, the desired trailer setpoint steering angle TSA-DES is set at the trailer 3 when this modified movement vector MV' (or the control signals CS derived from it) is processed in the drive train 20. The reversing device 30 thus takes into account the kinematic coupling between the trailer 3 and towing vehicle 2 and as a result permits extreme simplification of the maneuvering, and in particular reversing, of the vehicle 1. In particular, the reversing device 30 can be used to move the trailer 3 backward to the desired destination in a particularly easy way. The operator control of the trailer steering angle setpoint value sensor 32 corresponds here to the operator control of a steering wheel in a single-element vehicle such as, for example, a passenger car, when reversing.

According to a preferred procedure, the present movement vector MV which is fed to the drive train interface arrangement 28 by the operator control device 26 contains the present towing vehicle setpoint steering angle TVSA-DES. When the reversing device 30 is activated, the control device 29 uses the modified movement vector MV' in place of present movement vector MV. In order to generate the modified movement vector MV', the reversing device 30 first obtains the present movement vector MV from the drive train interface arrangement 28 and extracts the present towing vehicle setpoint steering angle TVSA-DES from it. In its place, the reversing device 30 inserts the calculated modified towing vehicle setpoint steering angle TVSA-DES' into the movement vector MV, as a result of which the modified movement vector MV' is produced and transmitted to the drive train interface arrangement 28.

Likewise, an integral design or integral networking is possible in which the reversing device 30 already replaces the present towing vehicle setpoint steering angle TVSA-DES with the modified towing vehicle setpoint steering angle TVSA-DES' in the active state before the movement vector MV is formed. The operator control device 26 accordingly already generates the modified movement vector MV' in the active state of the reversing device 30. In this variant, the reversing device 30 can expediently already be integrated into the operator control device 26. Furthermore, it is possible, also or alternatively, to integrate the trailer steering angle setpoint value sensor 32 into the operator control device 26.

In the particular embodiment shown here, the control system 19 also comprises a remote control device 33 which is remote from the vehicle 1 and can be moved independently with respect to it. The remote control device 33 also comprises a series of operator control elements 27 for activating the components 21 to 25 of the drive train 20 which correspond essentially to the operator control elements 27 of the operator control device which is fixed to the vehicle. Furthermore, the remote control device 33 is also equipped with the switch 31 for activating and deactivating it. A trailer steering angle setpoint value sensor 32 can also be provided. The remote control device 33 is connected to the drive train interface arrangement 28 via a transceiver arrangement 34 which is characterized by a curly bracket. The transceiver arrangement 34 comprises a transceiver unit 35 which is fixed to the vehicle and communicates with the drive train interface arrangement 28, and a transceiver unit 36 which is remote from the vehicle and communicates with the remote control device 33. The two transceiver units 35, 36 preferably communicate with one another wirelessly. The remote control device 33 and the transceiver unit 36 which is remote from the vehicle form a portable unit which can be carried along by the driver of the vehicle.

During normal operation (when the reversing device 30 is deactivated), the driver can input a driver request DR by means of the operator control device 33 in the customary fashion, and the remote control device 33 then generates the standardized movement vector from said driver request DR. The movement vector MV is transmitted by means of the transceiver arrangement 34 in the form of remote control signals FS and fed again as a movement vector to the drive train interface arrangement 28. Here, it can be tapped by the control device 29 and transformed into the corresponding control signals CS.

If the trailer 3 is to be moved with the train 1 into a specific position (destination) by reversing, the reversing device 30 is activated by activating the switch 31. The driver of the vehicle can use the trailer steering angle setpoint value sensor 32 (e.g., the steering wheel) to predefine trailer setpoint steering angles TSA-DES which have to be set at the trailer 3 in order to permit the destination to be reached by the trailer 3 when the trailer or the train 1 is maneuvered. In the active state, the reversing device 30 generates, in the way described above, the modified movement vector MV' which is then used by the control device 29 to generate the control signals. Here too it is basically possible to integrate the reversing device 30 into the remote control device 33.

In a further embodiment of the control system 19 in the active state, the towing vehicle steering angle setpoint value sensor $27_{23}$ is used as a trailer steering angle setpoint value sensor. This embodiment is based on the idea that in the active state of the reversing device 30, the towing vehicle steering angle setpoint value sensor $27_{23}$ is not required to input a towing vehicle setpoint steering angle TVSA-DES. This means that in the active state the setpoint steering angles which are generated by the towing vehicle steering angle setpoint value $27_{23}$ are not configured and used as towing vehicle setpoint steering angles TVSA-DES but rather as trailer setpoint steering angles TSA-DES. This procedure allows savings to be achieved by eliminating a steering angle setpoint value sensor, for example a steering wheel or a joystick.

In order to further improve driving safety, the reversing device 30 can be configured in such a way that, at least in the active state (but expediently also in the passive state), it continuously determines a maximum speed for the train 1 from the actual values of the trailer steering angle TSA-ACT and/or of the shaft angle SA-ACT. The speed of the train is then suitably restricted to this maximum speed. For example, the reversing device 30 provides the determined maximum speed by means of the drive train interface arrangement 28 so that the latter can be taken into account, for example, by the control device 29 during the generation of the control signals CS. Likewise, the maximum speed can already be taken into account during the generation of the movement vector MV.

Furthermore, the safety of the vehicle can also be increased if the reversing device 30 continuously monitors the actual values for the trailer steering angles TSA-ACT and—if they are present—of the shaft angle SA-ACT for predefined limiting values both in the active state and in the passive state. When a maximum permissible trailer steering angle TSA-ACT or shaft angle SA-ACT is reached, the reversing device 30 causes the train 1 to be braked. This measure avoids damage to the towing vehicle 2, trailer 3 and shaft 10 due to collisions. If this protective function applies, the driver of the vehicle must firstly drive in the opposite direction again in order to reduce the respective angle again. In particular it is possible, when a maximum limit for the trailer steering angle TSA-ACT and/or the shaft angle SA-ACT is exceeded, to initiate braking of the train 1 if the respective angle increases further, irrespective of the direction of movement of the vehicle 1 (forward or backward). This makes it possible to release an individual instance of "jack-knifing" between the towing vehicle 2 and trailer 3 of an articulated train, in each case without a critical self-locking state which is referred to as "deadlock".

Figure 4:
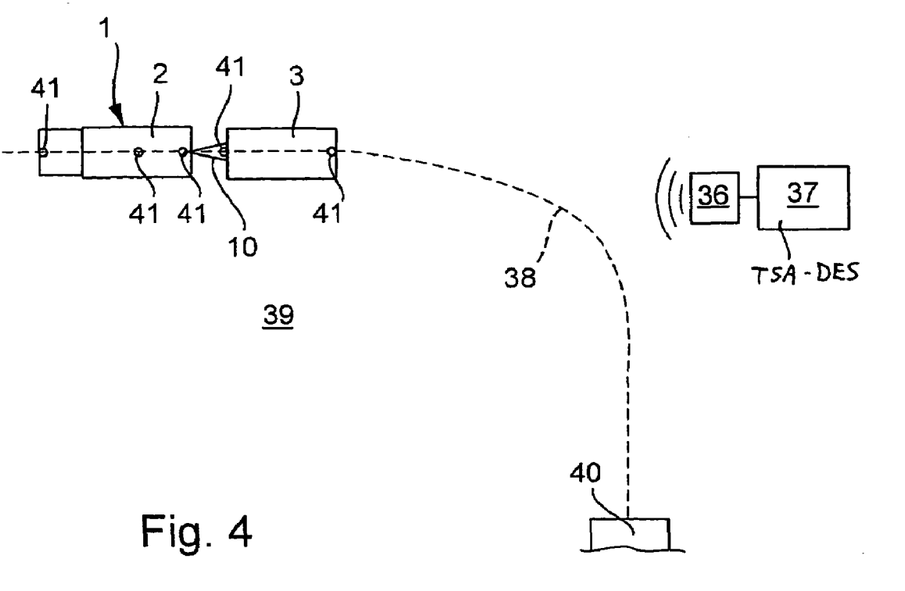
FIG. 4 is a simplified plan view of a train as in FIG. 1 but in a different embodiment.

According to FIG. 4, the control system 19 can also be equipped with a path-detection device 37 which can be arranged in the vehicle 1 or externally (as shown). The external path-detection device 37 communicates with the other components of the control system 19, for example by means of the transceiver arrangement 34. The path-detection device 37 detects a predetermined driving path mark 38 which is symbolized in FIG. 4 by a dashed line, and, in the active state of the reversing device 30, supplies the trailer setpoint steering angle TSA-DES as a function of this driving path mark 38. The driving path mark 38 is positioned, for example, on the ground in an area of land 39 and leads to a destination 40 for the train 1 or for the trailer 3. The area of land 39 is for example a loading station for trucks or a haulage yard. The destination 40 is formed, for example, by a loading ramp which has to be driven up backward. If the vehicle 1 follows the driving path mark 38 when reversing, the trailer 3 moves automatically forward at the rear as far as the loading ramp 40. There is no need for the driver of the vehicle to intervene in the process. Particularly for a loading station, an embodiment is possible in which a plurality of vehicles 1 can be remote-controlled simultaneously in a coordinated fashion, the path-detection device 37 making it considerably easier to find the destination 40 automatically.

The path-detection device 37 may operate, for example, with a radar system or the like which detects the position of the towing vehicle 1 within the area of land 39. Likewise it is possible for the vehicle 1 to be equipped with at least one camera 41 with which it is possible to monitor whether or not the train 1 is moving on the driving path mark 38. For example, the towing vehicle 1 can be equipped with three line-type cameras 41, and the trailer 3 can be equipped with two line-type cameras 41 that are directed vertically downward. A further camera 41 is mounted on the front of the towing vehicle 2. A further camera is arranged approximately 1 m in front of the rear axle or axles of the towing vehicle 2, and still another camera 41 is arranged approximately 1 m behind the rear axle or axles 41 of the towing vehicle 2. The cameras 41 of the trailer 3 are arranged in such a way that one is approximately 1 m behind the rear axle (that is, essentially on the rear of the trailer 3), while the other is arranged approximately 1 m in front of the articulated axle (in the region of the shaft 10 of the trailer 3). When the train 1 is extended, the cameras 41 all lie on a straight line. With this design it is possible for the cameras 41 to detect the linear driving path mark 38 in terms of its orientation and curvature both when traveling forward and when reversing. However, by means of the reversing device 30 according to the invention, a camera 41 which is arranged on the rear of the trailer 3 is sufficient to direct the rear of the trailer 3 to the loading ramp 40 when reversing.

Figure 5:
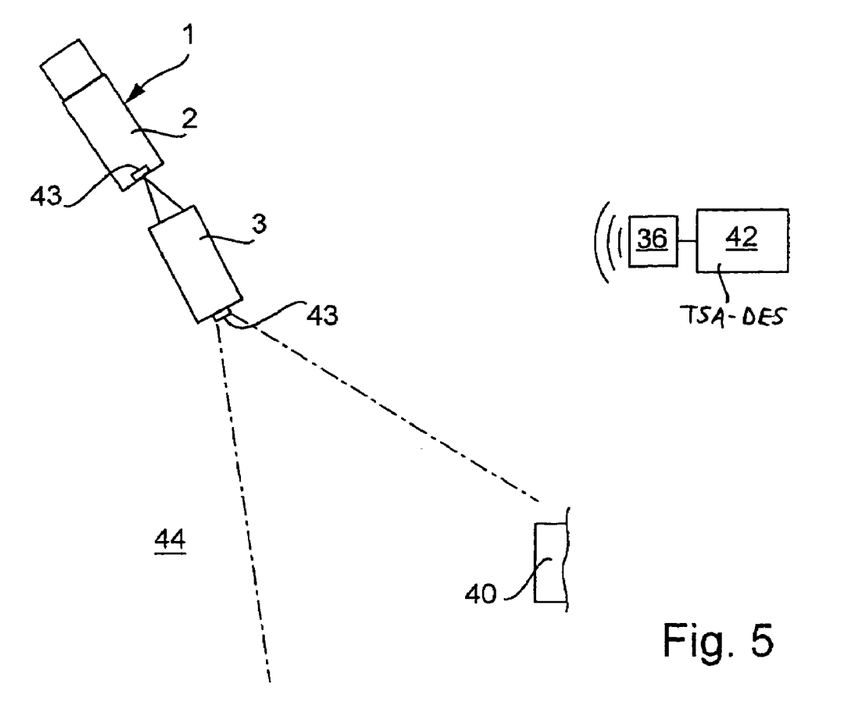
FIG. 5 shows a plan view as in FIG. 4, but in a different embodiment.

As shown in FIG. 5, the control system 19 according to the invention can additionally or alternatively be equipped with an optical line-detection device 42 arranged either internally or externally with respect to the vehicle 1. By means of a reversing camera 43 mounted on the rear of the trailer 3 of the train 1, the destination-detection device 42 can already detect the destination 40 at a distance from which the vehicle can readily be moved backward to the destination 40 by correctly steering the trailer 3. The images supplied by the reversing camera 43 are evaluated by an image-processing system of the destination-detection device 42. For example, images of predefined destinations 40 which have already been stored can be compared with the current image here. It is possible here, for example, to calculate the relative orientation and relative position of the trailer 3 with respect to the destination 40 from the extracted edges. By reference to this relative orientation and relative position it is possible to calculate a path which is to be traversed along in order to lead the trailer 3 to the destination 40 at the rear. In the process, the image-detection device 42 supplies the trailer setpoint steering angle TSA-DES, which considerably simplifies the reversing. This maneuvering operation using the destination-detection device 42 is also expediently carried out on an enclosed area of land 44 and can take place, as it were, fully automatically by the press of a button. It is also conceivable to mount a further reversing camera 43 on the rear of the towing vehicle 2 so that, in an expanded embodiment, the towing vehicle 2 without trailer 3 is also moved backward autonomously to a corresponding destination 40, for example the shaft 10 of the trailer 3 or the semitrailer coupling of a trailer 3 which is embodied as a semitrailer, or an interchangeable bridge.

Figure 6:
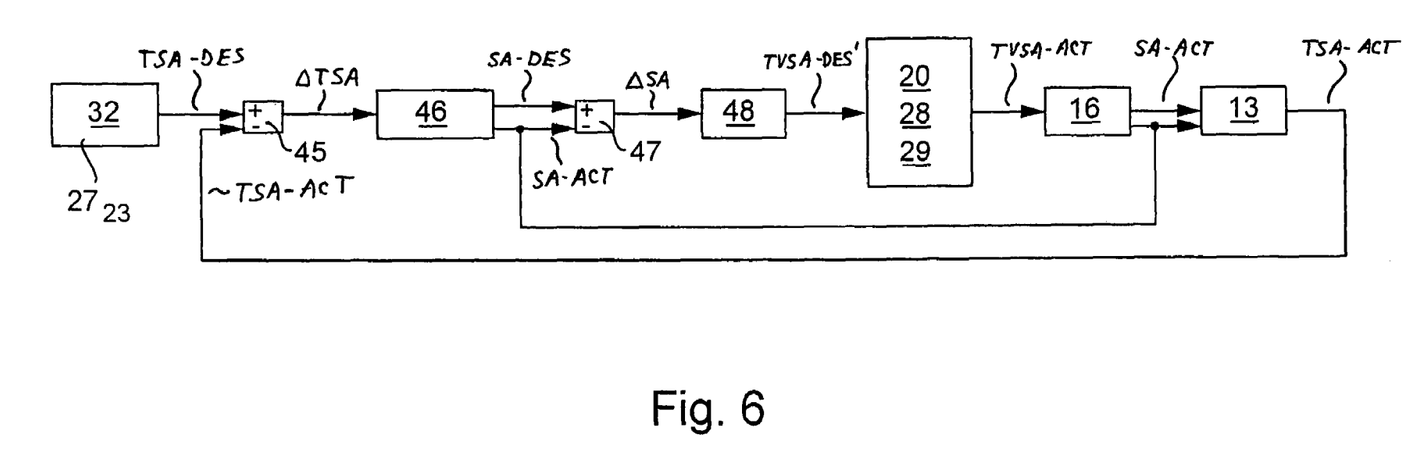
FIG. 6 shows a block diagram of a control structure.

FIG. 6 shows a controller structure for reversing an articulated train (cf. FIG. 1), which acts in the active state of the reversing device 30. The trailer setpoint steering angle TSA-DES is predefined by means of the trailer steering angle setpoint value sensor 32. As mentioned, the trailer steering angle setpoint value sensor 32 can be embodied on a remote control device 33 and expediently formed there by means of the towing vehicle steering angle setpoint value sensor $27_{23}$.

In a first comparator 45, a setpoint/actual comparison of the trailer steering angles is carried out and the control error ΔTSA is determined and transmitted to a guide controller 46 which determines a setpoint shaft angle SA-DES therefrom. In a second comparator 47 a setpoint/actual comparison of the shaft angles is carried out, a control error ΔSA being determined for the shaft angle and transmitted to a follow-up controller 48. As a function of the control error ΔSA of the shaft angle, the follow-up controller 48 generates the modified towing vehicle setpoint steering angle TVSA-DES' which is passed to the control device 29 in the form of the modified movement vector MV' via the drive train interface arrangement 28 and is finally passed to the drive train 20 in the form of corresponding control signals CS. In the drive train 20, the modified towing vehicle setpoint steering angle TVSA-DES' can then be converted. In this way, the towing vehicle actual steering angle TVSA-ACT occurs which acts on the shaft 10 when the train 1 moves, so that the shaft actual angle SA-ACT changes. The changing shaft actual angle SA-ACT is sensed by the shaft angle actual value sensor 16 and fed back to the second comparator 47. The changing shaft actual angle SA-ACT also brings about a change in the trailer actual steering angle TSA-ACT when the train 1 moves, in which case this change is sensed by the trailer steering angle actual value sensor 13. The trailer steering angle actual value sensor 13 then feeds back the current trailer actual steering angle TSA-ACT to the first comparator 45.

Figure 7:
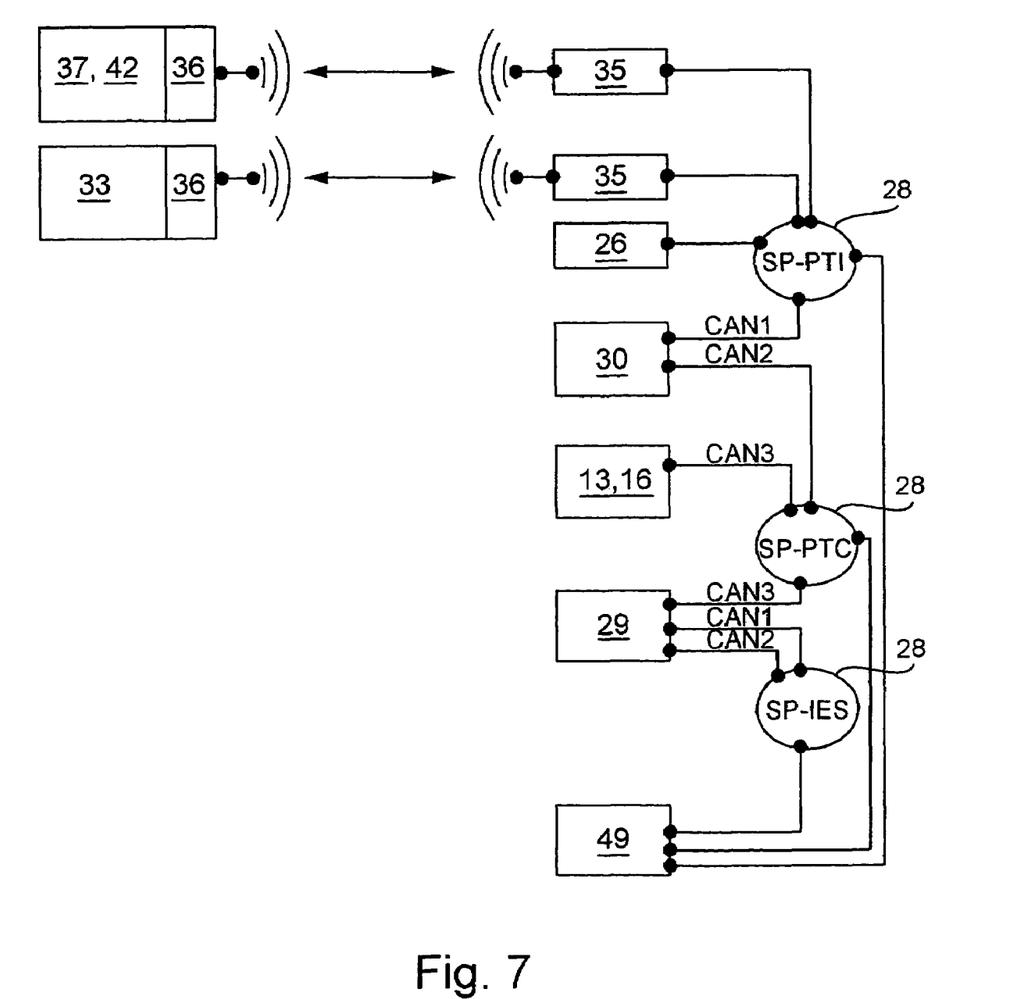
FIG. 7 shows a control unit architecture for implementing the control system.

FIG. 7 shows a preferred control unit architecture which can be of particularly simple design in the vehicle 1.

It is essential for the drive train interface arrangement 28 to comprise three star points: a first star point SP-PTI, a second star point SP-PTC and a third star point SP-IES. The operator control device 26 which is fixed to the vehicle, two transceiver units 35, a first bus CAN 1 and a monitoring device 49 are connected to the first star point SP-PTI. The remote control device 33 communicates with the first star point SP-PTI via the one transceiver unit 35. Another external device, for example the path-detection device 37 or the destination-detection device 42 communicates with the first star point SP-PTI by means of the second transceiver device 35.

The monitoring device 49 performs the monitoring, recording and later evaluation of the data streams which occur during operation, and is suitably designed to record data.

A data bus CAN 2, a third data bus CAN 3 and the monitoring device 49 are connected to the second star point SP-PTC. The first bus CAN 1, the second bus CAN 2 and the monitoring device 49 are connected to the third star point SP-IES.

In this architecture, the control device 29 is connected via the third star point SP-IES to the data bus of the vehicle 1 or of the drive train 20 and can actuate the vehicle 1 in accordance with the movement vector MV. The inputting of the driver request DR and the generation of the movement vector MV are carried out here via the first star point SP-PTI. Correspondingly, the reversing device 30 is also connected to the first star point SP-PTI via the first bus CAN 1. The trailer steering angle actual value sensor 13 and the shaft angle actual value sensor 16 communicate via a third bus CAN 3 with the second star point SP-PTC to which the reversing device 30 is also connected via the second data bus CAN 2.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for a train, composed of at least a towing vehicle and a trailer, and having an electronically actuatable drive train which includes at least one of a steering system, a brake system and a drive assembly, said control system comprising:
    an operator control device for receiving driver requests input by a vehicle driver, and generating a standardized movement vector based on the drive request;
    a controller arranged on the train, which controller generates control signals based on an input movement vector in order to actuate the drive train, and is coupled to the drive train, which processes the control signals in order to implement the driver request;
    a reversing device which can be switched between an active state and a passive state, and in said active state is operative to control a reverse movement of the train;
    a steering angle actual value sensor for determining a trailer actual steering angle of a wheel axle that steers the trailer, said steering angle actual value sensor being coupled to the reversing device in order to transmit the trailer actual steering angle; and
    a trailer steering angle setpoint value sensor by which the driver of the vehicle inputs a trailer setpoint steering angle, and which is coupled to the reversing device in order to transmit the trailer setpoint steering angle; wherein,
    the reversing device determines, from the trailer actual steering angle and the trailer setpoint steering angle, a modified towing vehicle setpoint steering angle for a wheel axle that steers the towing vehicle;
    in the active state of the reversing device, the modified towing vehicle setpoint steering angle takes the place of a present towing vehicle setpoint steering angle in forming a modified movement vector;
    said modified towing vehicle setpoint steering angle is determined such that, when the train travels, movement of the towing vehicle causes the trailer actual steering angle to conform to the trailer setpoint steering angle;
    the operator control device includes a towing vehicle steering angle setpoint value sensor by which the driver inputs the present towing vehicle setpoint steering angle which is included in a present movement vector, at least in the passive state of the reversing device;
    in the active state before the formation of the movement vector, the reversing device replaces the present towing vehicle setpoint steering angle with the modified towing vehicle setpoint steering angle, so that only the modified towing vehicle setpoint steering angle is included in the movement vector; or
    in the active state, the reversing device extracts the present towing vehicle setpoint steering angle from the present movement vector, and instead integrates the modified towing vehicle setpoint steering angle, so that only the movement vector which is modified in this way is generated.

2. The control system as claimed in claim 1, further comprising a drive train interface arrangement, to which the operator control device, controller and the reversing device are connected.

3. A control system for a train, composed of at least a towing vehicle and a trailer, and having an electronically actuatable drive train which includes at least one of a steering system, a brake system and a drive assembly, said control system comprising:
    an operator control device for receiving driver requests input by a vehicle driver, and generating a standardized movement vector based on the drive request;
    a controller arranged on the train, which controller generates control signals based on an input movement vector in order to actuate the drive train, and is coupled to the drive train, which processes the control signals in order to implement the driver request;
    a reversing device which can be switched between an active state and a passive state, and in said active state is operative to control a reverse movement of the train;
    a steering angle actual value sensor for determining a trailer actual steering angle of a wheel axle that steers the trailer, said steering angle actual value sensor being coupled to the reversing device in order to transmit the trailer actual steering angle; and
    a trailer steering angle setpoint value sensor by which the driver of the vehicle inputs a trailer setpoint steering angle, and which is coupled to the reversing device in order to transmit the trailer setpoint steering angle; wherein,
    the reversing device determines, from the trailer actual steering angle and the trailer setpoint steering angle, a modified towing vehicle setpoint steering angle for a wheel axle that steers the towing vehicle;
    in the active state of the reversing device, the modified towing vehicle setpoint steering angle takes the place of a present towing vehicle setpoint steering angle in forming a modified movement vector;
    said modified towing vehicle setpoint steering angle is determined such that, when the train travels, movement of the towing vehicle causes the trailer actual steering angle to conform to the trailer setpoint steering angle;
    said control system further comprises a remote control device which is operable at points that are remote from the train, receives driver requests and generates the movement vector based on the driver request; and a transceiver arrangement which connects the remote control device to a drive train interface arrangement to which the operator control device, the reversing device and the controller are also connected; and the remote control device has one of a towing vehicle steering angle setpoint value sensor which the reversing device uses in the active state as a trailer steering angle setpoint value sensor, and a trailer steering angle setpoint value sensor.

4. The control system as claimed in claim 1, wherein:

the trailer steering angle setpoint value sensor is formed, in the active state, by a towing vehicle steering angle setpoint value sensor by which the driver inputs the present towing vehicle setpoint steering angle in the passive state of the reversing device; and the reversing device uses the towing vehicle setpoint steering angle as a trailer setpoint steering angle in the active state.

5. The control system as claimed in claim 2, wherein the drive train interface arrangement has at least one star connection.

6. A control system for a train, composed of at least a towing vehicle and a trailer, and having an electronically actuatable drive train which includes at least one of a steering system, a brake system and a drive assembly, said control system comprising:

an operator control device for receiving driver requests input by a vehicle driver, and generating a standardized movement vector based on the drive request;

a controller arranged on the train, which controller generates control signals based on an input movement vector in order to actuate the drive train, and is coupled to the drive train, which processes the control signals in order to implement the driver request;

a reversing device which can be switched between an active state and a passive state, and in said active state is operative to control a reverse movement of the train;

a steering angle actual value sensor for determining a trailer actual steering angle of a wheel axle that steers the trailer, said steering angle actual value sensor being coupled to the reversing device in order to transmit the trailer actual steering angle; and a trailer steering angle setpoint value sensor by which the driver of the vehicle inputs a trailer setpoint steering angle, and which is coupled to the reversing device in order to transmit the trailer setpoint steering angle; wherein, the reversing device determines, from the trailer actual steering angle and the trailer setpoint steering angle, a modified towing vehicle setpoint steering angle for a wheel axle that steers the towing vehicle;

in the active state of the reversing device, the modified towing vehicle setpoint steering angle takes the place of a present towing vehicle setpoint steering angle in forming a modified movement vector;

said modified towing vehicle setpoint steering angle is determined such that, when the train travels, movement of the towing vehicle causes the trailer actual steering angle to conform to the trailer setpoint steering angle;

the train is an articulated train in which, the wheel axle which steers the trailer has a live ring that is connected to a trailer coupling of the towing vehicle via a shaft, by which the live ring is rotatable;

the trailer steering angle actual value sensor determines an angle between a longitudinal axis of the trailer and a longitudinal axis of the shaft;

a shaft angle actual sensor is provided which determines an actual shaft angle between the longitudinal axis of the shaft and a longitudinal axis of the towing vehicle, and transmits the actual shaft angle to the reversing device; and the reversing device initially determines a shaft setpoint angle from the trailer actual steering angle and the trailer setpoint steering angle, and then determines the modified towing vehicle setpoint steering angle from the actual shaft angle and the shaft setpoint angle.

7. The control system as claimed in claim 1, wherein:

the train is a semitrailer train in which the trailer rests on the towing vehicle via a fifth wheel; and the trailer steering angle actual value sensor determines the angle between a longitudinal axis of the trailer and a longitudinal axis of the towing vehicle.

8. A control system for a train, composed of at least a towing vehicle and a trailer, and having an electronically actuatable drive train which includes at least one of a steering system, a brake system and a drive assembly, said control system comprising:

an operator control device for receiving driver requests input by a vehicle driver, and generating a standardized movement vector based on the drive request;

a controller arranged on the train, which controller generates control signals based on an input movement vector in order to actuate the drive train, and is coupled to the drive train, which processes the control signals in order to implement the driver request;

a reversing device which can be switched between an active state and a passive state, and in said active state is operative to control a reverse movement of the train;

a steering angle actual value sensor for determining a trailer actual steering angle of a wheel axle that steers the trailer, said steering angle actual value sensor being coupled to the reversing device in order to transmit the trailer actual steering angle; and a trailer steering angle setpoint value sensor by which the driver of the vehicle inputs a trailer setpoint steering angle, and which is coupled to the reversing device in order to transmit the trailer setpoint steering angle; wherein, the reversing device determines, from the trailer actual steering angle and the trailer setpoint steering angle, a modified towing vehicle setpoint steering angle for a wheel axle that steers the towing vehicle;

in the active state of the reversing device, the modified towing vehicle setpoint steering angle takes the place of a present towing vehicle setpoint steering angle in forming a modified movement vector;

said modified towing vehicle setpoint steering angle is determined such that, when the train travels, movement of the towing vehicle causes the trailer actual steering angle to conform to the trailer setpoint steering angle;

the reversing device continuously determines a maximum speed for the train, based on at least one of the actual trailer steering angle and a shaft angle; and the speed of the train is limited to the maximum speed.

9. The control system as claimed in claim 6, wherein:

in the active state and the passive state, the reversing device permanently monitors actual values of at least one of the trailer actual steering angle and the actual shaft angle, and initiates braking of the train when a maximum permissible trailer steering angle or shaft angle is reached.

10. The control system as claimed in claim 1, wherein:

an optical path-detection device is provided which detects a driving path mark that leads to a destination of the train and which, in the active state of the reversing device, permanently supplies the trailer setpoint steering angle in such a way that the train follows with reversing the driving path mark as far as the destination; and a drive train interface arrangement is provided to which the path-detection device, the reversing device, the operator control device and the control device are connected.

11. A control system for a train, composed of at least a towing vehicle and a trailer, and having an electronically actuatable drive train which includes at least one of a steering system, a brake system and a drive assembly, said control system comprising;

an operator control device for receiving driver requests input by a vehicle driver, and generating a standardized movement vector based on the drive request;

a controller arranged on the train, which controller generates control signals based on an input movement vector in order to actuate the drive train, and is coupled to the drive train, which processes the control signals in order to implement the driver request;

a reversing device which can be switched between an active state and a passive state, and in said active state is operative to control a reverse movement of the train;

a steering angle actual value sensor for determining a trailer actual steering angle of a wheel axle that steers the trailer, said steering angle actual value sensor being coupled to the reversing device in order to transmit the trailer actual steering angle; and a trailer steering angle setpoint value sensor by which the driver of the vehicle inputs a trailer setpoint steering angle, and which is coupled to the reversing device in order to transmit the trailer setpoint steering angle; wherein, the reversing device determines, from the trailer actual steering angle and the trailer setpoint steering angle, a modified towing vehicle setpoint steering angle for a wheel axle that steers the towing vehicle;

in the active state of the reversing device, the modified towing vehicle setpoint steering angle takes the place of a present towing vehicle setpoint steering angle in forming a modified movement vector;

said modified towing vehicle setpoint steering angle is determined such that, when the train travels, movement of the towing vehicle causes the trailer actual steering angle to conform to the trailer setpoint steering angle; and an optical destination-detection device is provided which detects a destination of the train from a distance and which, in the active state of the reversing device, permanently supplies the trailer setpoint steering angle in such a way that the train reaches the destination with reversing.

* * * * *